United States Patent
Kim et al.

(10) Patent No.: US 9,456,177 B2
(45) Date of Patent: Sep. 27, 2016

(54) VIDEO CONFERENCE DATA GENERATION

(71) Applicant: KT Corporation, Seongnam-si, Gyeonggi-do (KR)

(72) Inventors: Jun-won Kim, Guri-si (KR); Ji-young Choi, Seongnam-si (KR); Gyung-mo Kang, Seoul (KR); Ho-young Lee, Seoul (KR)

(73) Assignee: KT Corporation, Seongnam-si, Gyeonggi-do (KR)

( * ) Notice: Subject to any disclaimer, the term of this patent is extended or adjusted under 35 U.S.C. 154(b) by 0 days.

(21) Appl. No.: 14/582,408

(22) Filed: Dec. 24, 2014

(65) Prior Publication Data

US 2015/0189232 A1    Jul. 2, 2015

(30) Foreign Application Priority Data

Dec. 30, 2013  (KR) .................. 10-2013-0166602

(51) Int. Cl.
*H04N 7/14* (2006.01)
*H04N 7/15* (2006.01)
(Continued)

(52) U.S. Cl.
CPC .......... *H04N 7/147* (2013.01); *H04L 12/1827* (2013.01); *H04L 63/102* (2013.01); *H04L 63/105* (2013.01); *H04L 65/4038* (2013.01); *H04N 7/15* (2013.01)

(58) Field of Classification Search
CPC ... G01S 5/0072; H04L 12/18; H04L 63/102; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206
USPC ......... 348/14.01, 14.02, 14.03, 14.04, 14.05, 348/14.06, 14.07, 14.08, 14.09, 14.1, 14.11, 348/14.12, 14.13, 14.14, 15.15, 14.16; 379/265.03; 455/414.1, 566; 704/270
See application file for complete search history.

(56) References Cited

U.S. PATENT DOCUMENTS 7,277,546 B2 * 10/2007 Dhawan ................ H04K 1/04
                                                          375/E7.04
7,386,885 B1 *  6/2008 Kaspersky ............ G06F 21/52
                                                          713/164
7,730,535 B1 *  6/2010 Kaspersky ............ G06F 21/52
                                                          713/164

(Continued)

FOREIGN PATENT DOCUMENTS

KR    1020040026770    4/2004
KR    1020060019368    3/2006

(Continued)

*Primary Examiner* — Khai N Nguyen
(74) *Attorney, Agent, or Firm* — Brundidge & Stanger, P.C.

(57) ABSTRACT

In one example embodiment, a method performed under control of a server includes: receiving a user video from a transmitting device; generating conference video data that includes at least one portion of the user video; assigning, in accordance with a security level of a receiving device, a first portion of the conference video data a first security attribute; generating first security data corresponding to the first security attribute; and streaming, to the receiving device, the conference video data that includes the at least one portion of the user video and the first security data.

21 Claims, 10 Drawing Sheets

(51) Int. Cl.
*H04L 29/06* (2006.01)
*H04L 12/18* (2006.01)

(56) References Cited

U.S. PATENT DOCUMENTS

| | | | | |
|---|---|---|---|---|
| 7,864,959 | B2* | 1/2011 | Dhawan | H04K 1/04 370/203 |
| 8,781,969 | B2* | 7/2014 | Khandelwal | G06F 21/10 705/51 |
| 8,874,768 | B2* | 10/2014 | Holden | G06F 21/31 709/200 |
| 8,973,151 | B2* | 3/2015 | Doukhvalov | H04L 63/105 726/23 |
| 2004/0223615 | A1* | 11/2004 | Dhawan | H04K 1/04 380/261 |
| 2006/0271658 | A1* | 11/2006 | Beliles, Jr. | G08B 25/08 709/223 |
| 2008/0212777 | A1* | 9/2008 | Dhawan | H04K 1/04 380/269 |
| 2010/0208129 | A1* | 8/2010 | Rindfuss | G06K 9/2018 348/370 |
| 2011/0252092 | A1* | 10/2011 | Amemura | H04L 12/1818 709/204 |
| 2013/0017780 | A1* | 1/2013 | Rose | H04W 4/16 455/41.1 |
| 2013/0333018 | A1* | 12/2013 | Doukhvalov | H04L 63/105 726/11 |
| 2014/0181893 | A1* | 6/2014 | Von Bokern | H04L 63/0838 726/1 |
| 2014/0258403 | A1* | 9/2014 | Elmore | H04L 65/403 709/204 |
| 2014/0379403 | A1* | 12/2014 | Herger | G06Q 10/1095 705/7.19 |
| 2015/0245189 | A1* | 8/2015 | Nalluri | G06Q 50/265 455/404.1 |

FOREIGN PATENT DOCUMENTS

| | | |
|---|---|---|
| KR | 1020070018269 | 2/2007 |
| KR | 1020080016145 | 2/2008 |

* cited by examiner

VIDEO CONFERENCE DATA GENERATION

TECHNICAL FIELD

The embodiments described herein pertain generally to video conference data generation.

BACKGROUND

Videoconferencing enables two or more participants to communicate with each other by simultaneous two-way video and audio transmissions. Typically, a videoconferencing server may encode audio and video data and send the same audio and video data to all participating terminals.

SUMMARY

In one example embodiment, a method performed under control of a server may include: receiving a user video from a transmitting device; generating conference video data that includes at least one portion of the user video; assigning, in accordance with a security level of a receiving device, a first portion of the conference video data a first security attribute; generating first security data corresponding to the first security attribute; and streaming, to the receiving device, the conference video data that includes the at least one portion of the user video and the first security data.

In another example embodiment, a server may include: a receiver configured to receive a user video from a transmitting device; a video data generator configured to generate conference video data that includes at least one portion of the user video; a security domain unit configured to assign, in accordance with a security level of a receiving device, a first portion of the conference video data a first security attribute; a security data generator configured to generate first security data corresponding to the first security attribute; and a streamer configured to stream, to the receiving device, the conference video data that includes the at least one portion of the user video and the first security data.

In yet another example embodiment, a receiving device may include: a receiver configured to receive, from a server, conference video data that includes at least one portion of a user video from a transmitting device and security data; a generator configured to generate replacement video data in accordance with the security data; and a video displayer configured to display the conference video data and the replacement video data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
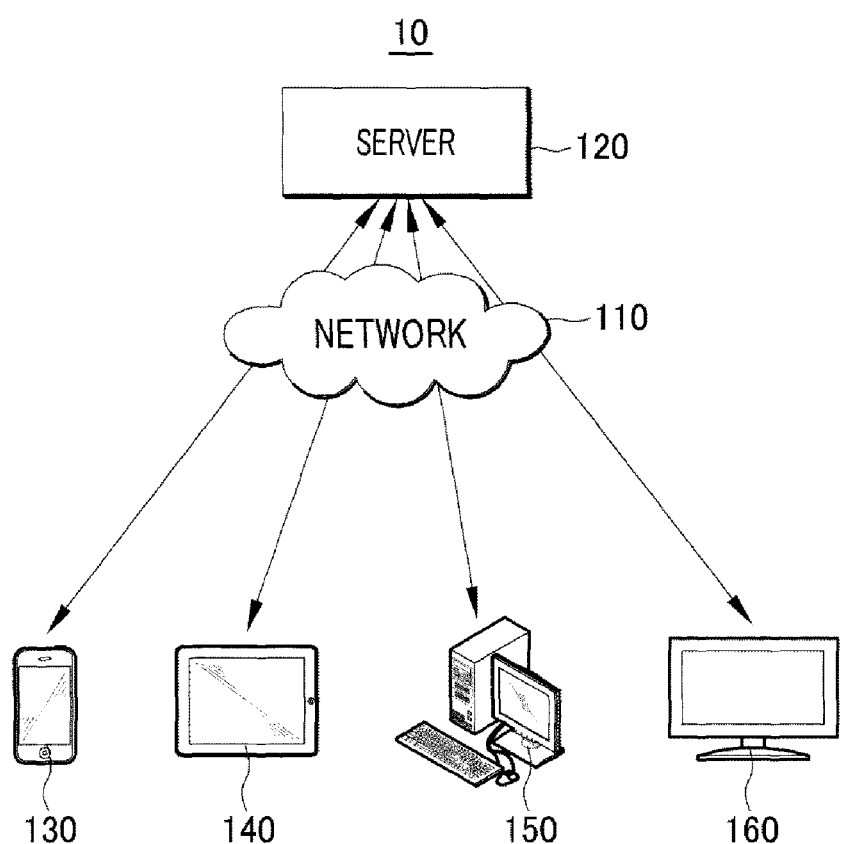
FIG. 1 shows an example system in which one or more embodiments of video conference data generation may be implemented, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 10 in which one or more embodiments of video conference video data generation may be implemented, in accordance with various embodiments described herein. As depicted in FIG. 1, system configuration 10 may include, at least, a server 120, a first device 130, a second device 140, a third device 150, and a fourth device 160 which may be collectively referred to as devices. At least two or more of server 120 and devices including the first device 130, the second device 140, the third device 150, and the fourth device 160 may be communicatively connected to each other via a network 110. Embodiments of system 10 are not limited in quantity to four devices. Alternative embodiments may have fewer than four devices or more than four devices. The embodiment depicted in FIG. 1 and described herein is provided as an example, intended to demonstrate the diversity of devices that may be implemented in any of the embodiments.

Network 110 may be a wired or wireless information or telecommunications network. Non-limiting examples of network 110 may include a wired network such as a LAN (Local Area Network), a WAN (Wide Area Network), a VAN (Value Added Network) or the like. Other non-limiting examples of network 110 may include wireless networks such as a mobile radio communication network, including at least one of a 3rd, 4th, or 5th generation mobile telecommunications network (3G), (4G), or (5G); various other mobile telecommunications networks; a satellite network; WiBro (Wireless Broadband Internet); Mobile WiMAX (Worldwide Interoperability for Microwave Access); HSDPA (High Speed Downlink Packet Access) or the like.

Devices 130, 140, 150, and 160 may refer to devices that are configured and/or operable to receive and display conference video data in various video and audio formats. Non-limiting examples of devices may include, for example, but not as a limitation, an IPTV (Internet Protocol Television), a Smart TV, a notebook computer, a personal computer, a smart phone, a digital camera, a remote controller, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro terminal.

Server 120 may refer to a server or other computing device that may be configured and/or operable to receive a user video from the respective one of devices 130, 140, 150, and 160. For example, if four users participate in a video conference through four respective devices 130, 140, 150, and 160, server 120 may receive live video streams from each of the four transmitting devices, e.g., first device 130, second device 140, third device 150, and fourth device 160. The live video streams may be generated by a video capturing apparatus in the respective transmitting devices, such as a video camera embedded in cellular phone 130 or a monitor of devices 140, 150, and/or 160. In some embodiments, the live video streams may be accompanied by pre-recorded video files, image files, document files, audio and/or music files, etc.

While or after server 120 receives a live video stream from two or more of transmitting devices 130, 140, 150, and 160, server 120 may generate composite video conference data that includes at least one portion of the received video streams. For example, if the video conference includes respective users of at least two of transmitting devices 130, 140, 150, and 160, server 120 may generate composite video conference data that includes at least a portion of the live video stream of all participating device users. For example, the conference video screen may be divided into multiple, equal-sized portions, each configured to accommodate at least a portion of the live video stream, or accompanying file, from each of the participating devices.

Further, while, or after server 120 generates the composite video conference data that includes at least one portion of the live stream video from each of the devices 130, 140, 150, and/or 160, server 120 may further assign a security attribute to the composite video conference data that is appropriate for each of the respective participating devices. The security attribute may be determined by server 120 based on the security requirements including the grade data assigned to the respective participating devices. That is, the grade data may represent a security level of the respective participating devices that is determined based on what authority the respective participating devices 130, 140, 150, and 160 may have.

As examples of the security attributes and the security requirements, it is assumed that four participating devices 130, 140, 150, and 160 are participating in a video conference. Before participating device transmits a live video stream to server 120, each participating device may be assigned the respective grade data, at least. Then, each participating device may transmit, to server 120, the respective live video streams together with each grade data. For example, if a user of device 160 has the greatest status such as managing the meeting while device 160 is displaying the composite video conference data, the device 160 may be assigned the first grade data.

If both users of devices 140 and 150 have the second greatest status, devices 140 and 150 may be assigned the second grade data. It may indicate that devices 140 and 150 may not be able to display the portion of the live stream video from device 160, because device 160 has the greater status than devices 140 and 150.

Lastly, if a user of device 130 has the least status among four participating device users, device 130 may be assigned the third grade data. It may indicate that device 130 may not be able to display the portions of the live stream video received from devices 140, 150, and 160. Further, based on the received grade data, server 120 may identify and assign the respective security attribute corresponding to the received grade data.

That is, server 120 may assign a first security attribute to the composite that is appropriate for the security requirements for participating device 130 while also assigning a second security attribute to the composite video conference data that is appropriate for the security requirements for participating device 140, a third security attribute to the composite video conference data that is appropriate for the security requirements for participating device 150, and no security attribute to the composite video conference data that is appropriate for the security requirements for participating device 160 if participating device 160 corresponds to the first grade, that is, chairman status managing the conference meeting. Although the foregoing example refers to each of participating devices 130, 140, 150, and 160 having a different security requirement, alternative embodiments may contemplate various participating devices having common security requirements.

Server 120 may be still further configured to generate a first, a second, and a third security data corresponding to each of the first, the second, and the third security attribute. With respect to device 130, to substitute or replace the portions of the live stream from devices 140, 150, and 160 in the composite video conference data, the first security data may include instruction data to generate the same size image or video file to substitute or replace such portions.

On the contrary, with regard to devices 140 and 150, the respective one of the second security data and the third security data may include instruction data to generate the same size image or video file to substitute or replace such a portion. In case of device 160, because no security attribute is assigned to device 160, no security data may be generated for device 160.

After server 120 generates the first, the second and the third security data, server 120 may be configured to stream, to the respective devices, the composite conference video data and the respective security data. For example, server 120 may stream, to device 130, the composite conference video data and the first security data so that device 130 may display the composite conference video screen overlapped with replacement video data generated by device 130 based on the first security data. As a result, a user of device 130 may watch only one of multiple, equal-sized portions of the conference video screen, a portion of the live stream from device 130.

Server 120 may be configured to re-set the security level of the receiving device. By way of example, server 120 may re-set the security level of the second or third level user to the first level for a specific time slot, e.g. 14:00~14:30. For example, in case that while in video conference, a common issue is raised to be discussed among the first, second and third users for the specific time slot, the second and the third level may be updated to the first level in order for such level users to discuss the common issue watching the conference video data. After the discussion of the common issue is completed, server 120 may re-set the updated first levels to the second and the third level as before.

After server 120 re-sets the security level of the receiving device, server 120 may be further configured to assign, in accordance with the reset security level, a third portion of the conference video data to a reset security attribute. By way of example, in case that server 120 re-sets the security level of the third level user to the second level, server 120 may assign a portion corresponding to the first level a reset security attribute, while before re-setting server 120 assigned a portion corresponding to the first and the second level a security attribute.

After server 120 assigns the reset security attribute, server 120 may generate reset security data corresponding to the reset security attribute, and stream, to the receiving device, the reset security data. By way of example, in case that server 120 re-sets the security level of the third level user to the second level, the generated reset security data may correspond to a security data for replacing a portion of the first level, and the third level device may receive the generated reset security data and manipulate the conference video data with the generated reset security data so that the third level user may watch the second and the third level users.

Server 120 may be configured to receive another file from another transmitting device. By way of example, it is assumed that the respective security levels of four users correspond to the first, the second, the second, the third level. If the first level user transmits a document file of the second level (e.g. an image, a video, or the like may be an example of the file) to server 120 while in a conference, server 120 may receive the document file to be shared among the four users participating in the conference. Here, a document file transmitted from a user may also be assigned a security level, e.g., second level.

After server 120 receives such file, server 120 may be further configured to generate further video data including such file and to compare a security level of such file with the security level of the receiving device. By way of example, server 120 may generate a further video data including such file of the second level in order to replace the existing conference video data including four users, and compare the second level of such file with the respective user levels (the first, the second, and the third level).

For example, if the receiving device corresponds to the third level, the third level may be compared with the second level of such file. Similarly, if the receiving device corresponds to the second level, the second level may be compared with the second level of such file. Lastly, if the receiving device corresponds to the first level, the first level may be compared with the second level of such file.

After server 120 generates further video data including such file and compares a security level of such file with the security level of the receiving device, server 120 may be configured to generate security data for such file based on the comparison with the security data. By way of example, if the receiving device corresponds to the third level, the third level device may not watch the further video data, because the third level is lower than the second level of such file. Thus, server 120 may generate security data to be transmitted to the third level device for the user of the third level device not to watch the further video data.

On the contrary, if the receiving device corresponds to the second level, because the second level device may have an authority to watch the further video data, server 120 may not have to generate security data for the second level device. Similarly, if the receiving device corresponds to the first level, because the first level device may have an authority to watch the further video data, server 120 may not have to generate security data for the first level device.

After server 120 generates security data for such file based on the comparison with the security data, server 120 may be configured to stream, to the receiving device, the further video data that includes such file and the security data for such file. By way of example, if the receiving device corresponds to the first and the second level, server 120 may stream, to the first and the second level devices, only the further video data including such file, because these devices may have an authority to watch such file. On the contrary, if the receiving device corresponds to the third level, server 120 may stream, to the third level, the further video data that includes such file and the security data for such file that replaces the further video data. (e.g. image, other video, or black screen)

Server 120 may be configured to receive, from a transmitting device, an instruction to remove a security attribute assigned to a device. By way of example, it is assumed that four users participates in a conference, the respective security levels for the four users correspond to the first, the second, the second, and the third, and the first level user is appointed a chairman. The chairman may have a discretion to decide which receiving device may not watch a conference video data.

As a default setting, it is assumed that the second level users may not watch the first level user, while the third level user may not watch the first and the second level users. If the chairman decides, for a specific issue, that the third level user should watch the first and the second level users, the chairman (the first level user) may transmit an instruction to remove the security attribute assigned to the third level user. As a result, the third level user may watch all the users, but the second users may not watch the first level user.

After server 120 receives the instruction to remove the security attribute, server 120 may be configured to generate updated security date to remove the security attribute and to transmit the updated security data to the receiving device. By way of example, if the third level device receives a security data to replace the first level and the second level portions in the conference video data, updated security date may be generated to remove the security data and transmitted to the third level device.

Thus, FIG. 1 shows example system 10 in which one or more embodiments of a generation of conference video data may be implemented, in accordance with various embodiments described herein.

Figure 2:
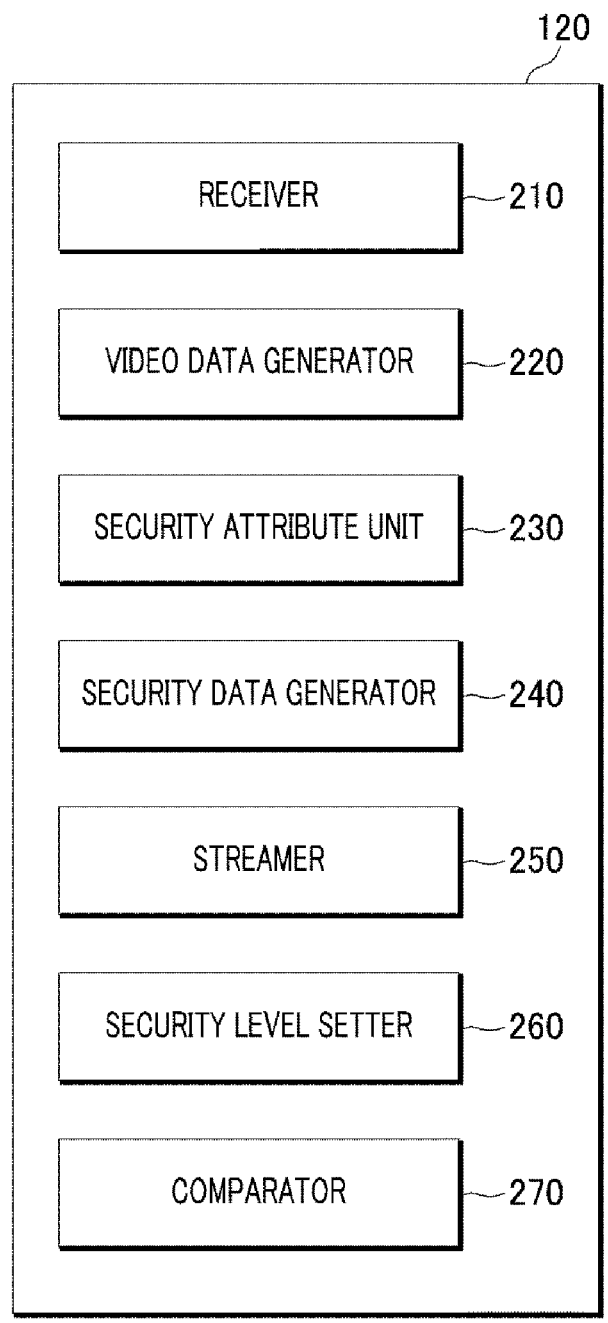
FIG. 2 shows an example device in which at least portions of video conference data generation may be implemented, in accordance with various embodiments described herein.

FIG. 2 shows an example device in which at least portions of a generation of conference video data may be implemented, in accordance with various embodiments described herein. As depicted in FIG. 2, server 120 may include a receiver configured to receive a user video from a transmitting device, a video data generator configured to generate conference video data that includes at least one portion of the user video, a security attribute unit configured to assign, in accordance with a security level of a receiving device, a first portion of the conference video data to a first security attribute, a security data generator configured to generate first security data corresponding to the first security attribute, and a streamer configured to stream, to the receiving device, the conference video data that includes the at least one portion of the user video and the first security data.

In some embodiments, receiver 210 may be configured to receive a user video from a transmitting device. For example, if four users participate in a video conference through four respective transmitting devices, server 120 may receive the respective four videos recording four users' face, body and background from four transmitting devices, e.g. the first device 130, the second device 140, the third device 150, and the fourth device 160. Such four videos may be recorded by recording apparatus in the respective transmitting devices, such as video camera embedded in cellular phone or monitor. Further, the four videos may include document, image, video, music, or the like.

In some embodiments, video data generator 220 may be configured to generate conference video data that includes at least one portion of the user video. For example, the conference video data may include various arrangements of four videos received from the four transmitting devices, such as diamond, circular, square, or triangle formation.

In some embodiments, security attribute unit 230 may be configured to assign, in accordance with a security level of a receiving device, a first portion of the conference video data a first security attribute. At the same time, security attribute unit 230 may be further configured to assign, in accordance with a security level of another receiving device, a second portion of the conference video data a second security attribute.

In some embodiments, it is assumed that four users (two first level users, one second level user, and one third level user) are participating in a video conference. The second level device (or the user's security level corresponding to the second level) may not watch the corresponding section(s) to a user or users of higher level (or the first level), given that the conference video screen is divided into four sections corresponding to each user. That is, the user of the second level device may be capable of watching the section(s) corresponding to a user or users of the second level or lower level. That is, the second level user may watch only two sections including himself and the third level user.

In the assignment of security attribute, for the users of the first level, security attribute unit 230 does not have to assign any portion of the conference video data any security attribute. On the contrary, for the user of the second level, security attribute unit 230 may assign a first portion corresponding to the first level users a first security attribute so that the second level user may not watch the corresponding first portion. For the user of the third level, security attribute unit 230 may assign a second portion corresponding to the first and second users a second security attribute so that the third level user may not watch the second corresponding portion.

In some embodiments, security data generator 240 may be configured to generate first security data corresponding to the first security attribute and second security data corresponding to the second security attribute. For example, for the first level users, security data generator 240 may not generate any security data, because the first lever users may watch the generated conference video data not manipulated by any security data.

On the contrary, for the second level user, security data generator 240 may generate first security data corresponding to the first security attribute so that the first security data may substitute or replace the first portion of the conference video data. The first security data may include the same size image or video file to substitute or replace the first portion, key data to activate such image or video file, audio data distinguished from audio data from the first level users, an instruction to deactivate audio data from the first level users, a chroma key/chroma back value, or the like. In addition, the chroma key/chroma back value may include at least one of attribute information, file size information, RGB information, or brightness information of replacement video data to be displayed in accordance with the first security attribute.

For the third level user, security data generator 240 may generate second security data corresponding to the second security attribute so that the second security data may substitute or replace the second portion of the conference video data including the first and second level users.

In some embodiments, streamer 250 may be configured to stream, to the receiving device, the conference video data that includes the at least one portion of the user video and the first security data. Streamer 250 may be further configured to stream, to another receiving device, the conference video data that includes the at least one portion of the user video and the second security data.

For example, for the first level users, streamer 250 may stream, to the first level devices, the conference video data including four users without any security data. On the contrary, for the second user, streamer 250 may stream, to the second level device, the conference video data including four users and the first security data.

That is, the second level user may watch the manipulated conference video data by the first security data including only two users (the second and the third level users). This is because the first security data serves to generate the replacement video data corresponding to the first portion of the conference video data, and the second level device serves to overlap the conference video data with the generated replacement video data.

For the third level user, streamer 250 may stream, to the third level device, the conference video data including four users and the second security data. That is, the third level user may watch the manipulated conference video data by the second security data including only one user (the third level user himself). This is because the second security data serves to generate the replacement video data corresponding to the second portion of the conference video data, and the third level device serves to overlap the conference video data with the generated replacement video data.

In some embodiments, security level setter 260 may be configured to reset the security level of the receiving device. For example, security level setter 260 may re-set the security level of the second level user to the first level for a specific time slot, e.g. 15:00~1530. For example, in case that while in video conference, a discussion issue needs to be shared among the first and second users for the specific time slot, the second level has to be updated to the first level in order for the second level users to discuss the common issue with the first level users while watching the conference video data. After the discussion of the common issue is completed, security level setter 260 may re-set the updated first levels to the second level as before.

In some embodiments, comparator 270 may be configured to compare a security level of a file received from a transmitting device with the security level of the receiving device. For example, it is assumed that the respective security levels of four users correspond to the first, the first, the second, the third level. If a first level user transmits a document file of the second level to server 120 while in a conference, server 120 may receive the document file to be shared among the four users participating in the conference. Then, comparator 270 may compare the second level (the security level of the document file) with the security level of the respective four receiving devices. As a result of the comparison, because only the third level device is lower than the second level, the two first level and the second level devices may watch the document file while the third level device may not.

Thus, FIG. 2 shows an example device in which at least portions of a generation of conference video data may be implemented, in accordance with various embodiments described herein.

Figure 3:
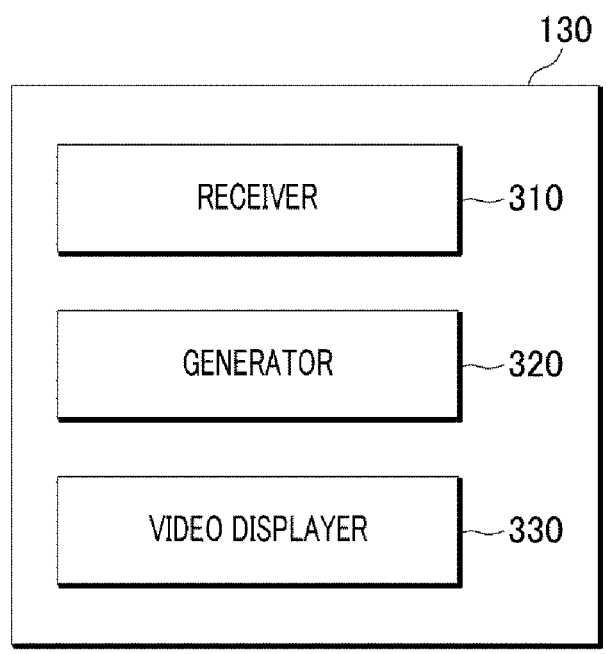
FIG. 3 shows an example device in which at least portions of video conference data generation may be implemented, in accordance with various embodiments described herein.

FIG. 3 shows an example device in which at least portions of a generation of conference video data may be implemented, in accordance with various embodiments described herein. As depicted in FIG. 3, receiving device 130 may include receiver 310 configured to receive, from a server, conference video data that includes at least one portion of a user video from a transmitting device and security data, generator 320 configured to generate replacement video data in accordance with the security data, and video displayer 330 configured to display the conference video data and the replacement video data.

In some embodiments, receiver 310 may be configured to receive, from server 120, conference video data from a transmitting device and security data. For example, it is assumed that the respective security levels of four users correspond to the first, the first, the second, the third level. If a security level of the receiving device corresponds to the second level, receiver 310 may receive conference video data including the four users and security data corresponding to the security attribute assigned a portion including two first level users.

In some embodiments, generator 320 may be configured to generate replacement video data in accordance with the security data. For example, the security data may include at least one instruction to generate replacement video data having a same size and shape as the security attribute and to overlap the conference video data with the replacement video data.

In addition, the security data may include a chroma key value or a chroma back value that includes at least one of attribute information, file size information, RGB information, or brightness information of replacement video data to be displayed in accordance with the security attribute. By using the chroma key/chroma back value, generator 320 may generate replacement video data.

In some embodiments, video displayer 330 may be configured to display the conference video data and the replacement video data. For example, the second level device may display a manipulated conference video by overlapping the conference video data with the replacement video data.

Thus, FIG. 3 shows an example device in which at least portions of a generation of conference video data may be implemented, in accordance with various embodiments described herein.

Figure 4:
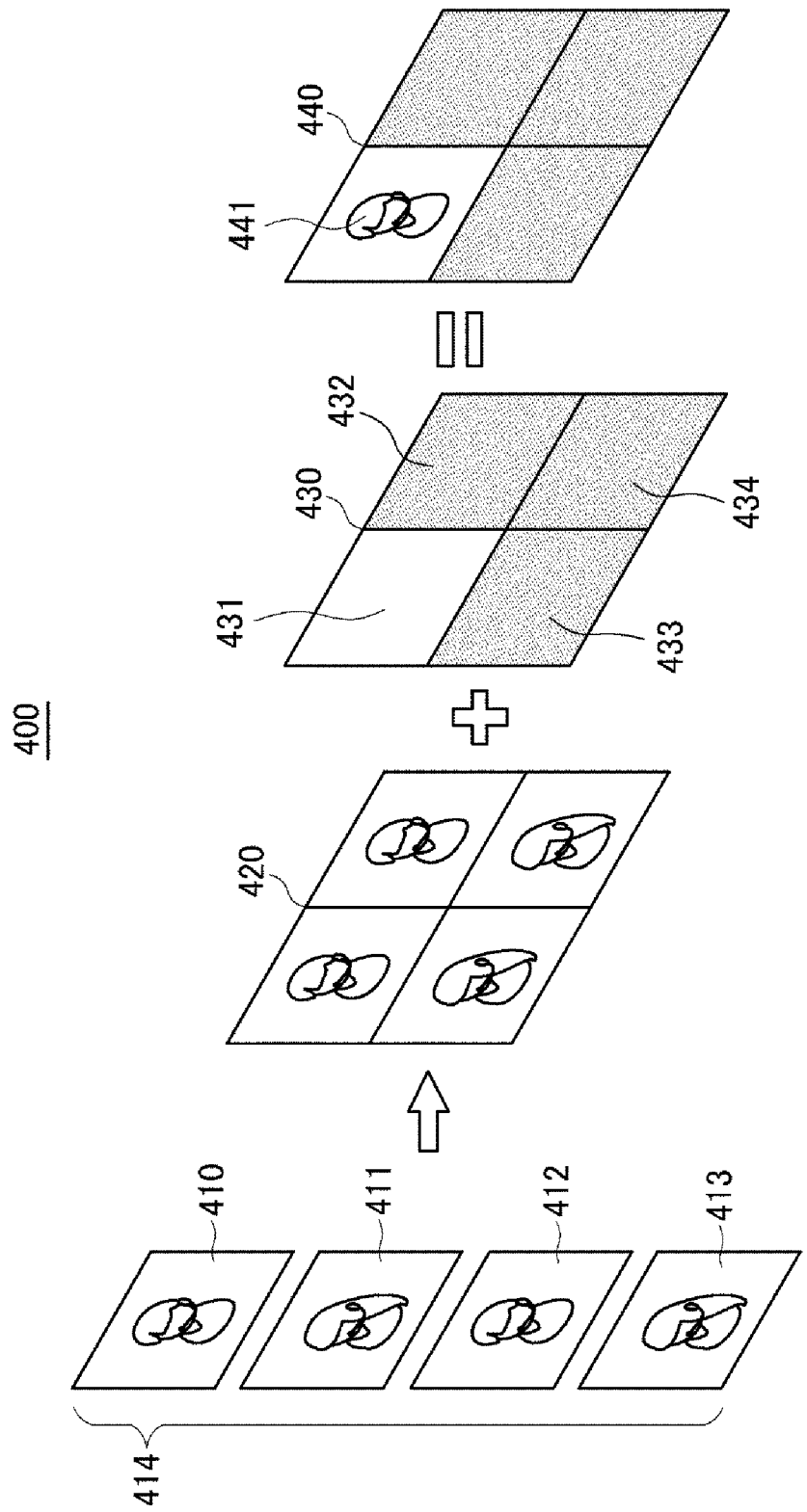
FIG. 4 shows an illustrative depiction of video conference data generation, in accordance with various embodiments described herein.

FIG. 4 shows an illustrative example process by which at least portions of a generation of conference video data may be implemented, in accordance with various embodiments described herein. In some embodiments, it is assumed that the transmitting devices 410 to 413 respectively correspond to the third, the second, the second, and the first level. The transmitting devices 410 to 413 may transmit the respective videos to server 120, and server 120 may generate conference video data 420 including a collection of videos 414.

If device 410 is a receiving device, server 120 may compare the security level of the receiving device 410 with those of the rest three transmitting devices (or users) 411 to 413. As a result of the comparison, the receiving device 410 may not watch the rest three users, because the security level of the receiving device (third level) is lower than those of the three devices 411 to 413. Thus, server 120 may assign a portion of the conference video data 432 to 434 a first security attribute, and generate first security data corresponding to the first security attribute. After server 120 streams, to the receiving device 410, the conference video data 420 and the first security data 430, the receiving device may display a manipulated conference video data 440 including only the receiving device user 441 by overlapping the conference video data 420 with the first security data 430.

Thus, FIG. 4 shows an illustrative example process by which at least portions of a generation of conference video data may be implemented, in accordance with various embodiments described herein.

Figure 5:
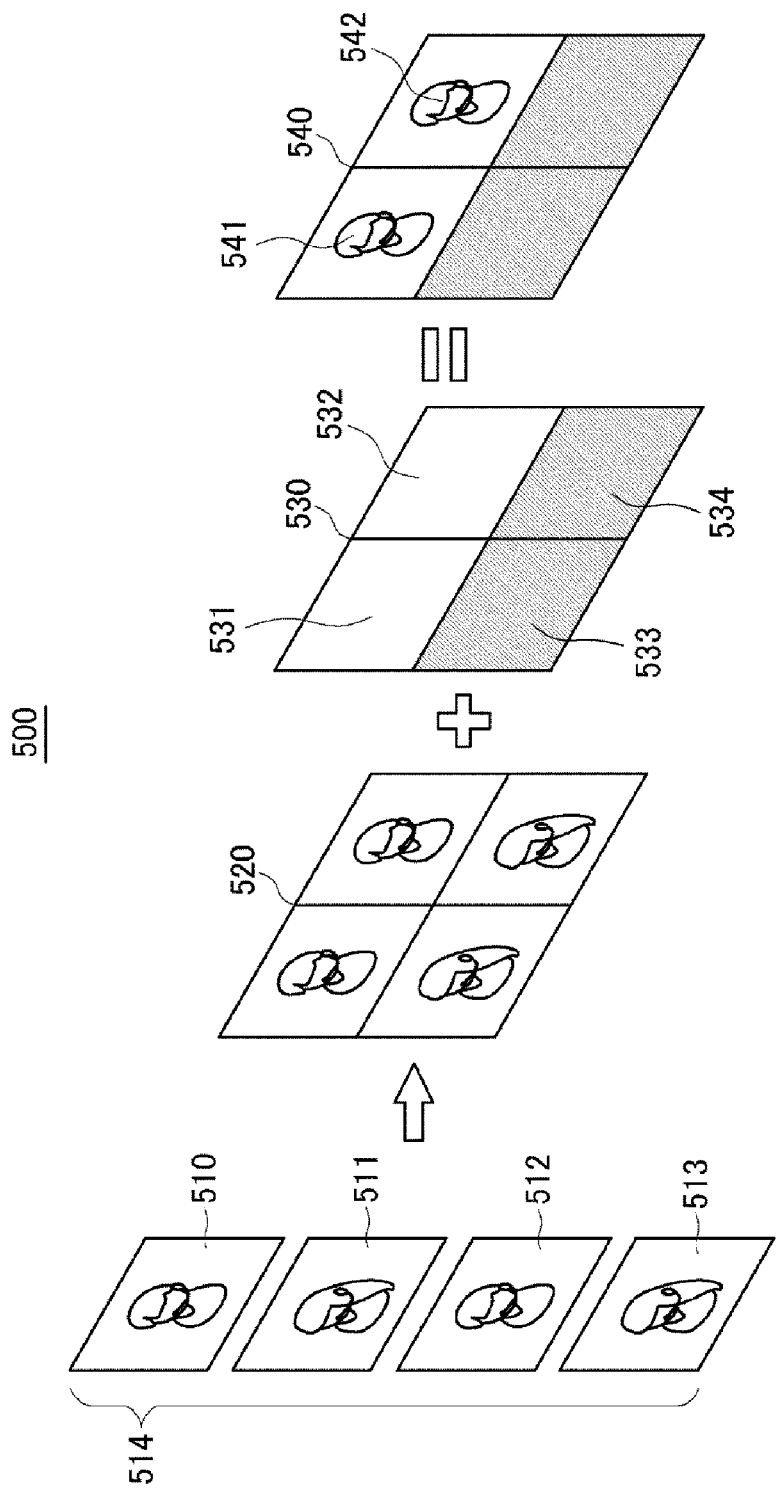
FIG. 5 shows another illustrative depiction of video conference data generation, in accordance with various embodiments described herein.

FIG. 5 shows an illustrative example process by which at least portions of a generation of conference video data may be implemented, in accordance with various embodiments described herein. In some embodiments, it is assumed that the transmitting devices 510 to 513 respectively correspond to the third, the third, the second, and the first level. The transmitting devices 510 to 513 may transmit the respective videos to server 120, and server 120 may generate conference video data 520 including a collection of videos 514.

If device 510 is a receiving device, server 120 may compare the security level of the receiving device 510 with those of the rest three transmitting devices (or users) 511 to 513. As a result of the comparison, the receiving device 510 may not watch the two users 512 and 513, because the security level of the receiving device (third level) is lower than those of the two devices 512 to 513.

Thus, server 120 may assign a portion of the conference video data 533 to 534 a second security attribute, and generate second security data corresponding to the second security attribute. After server 120 streams, to the receiving device 510, the conference video data 520 and the second security data 530, the receiving device 510 may display a manipulated conference video data 540 including the receiving device users 541 and 542 by overlapping the conference video data 520 with the second security data 530.

Thus, FIG. 5 shows an illustrative example process by which at least portions of a generation of conference video data may be implemented, in accordance with various embodiments described herein.

Figure 6:
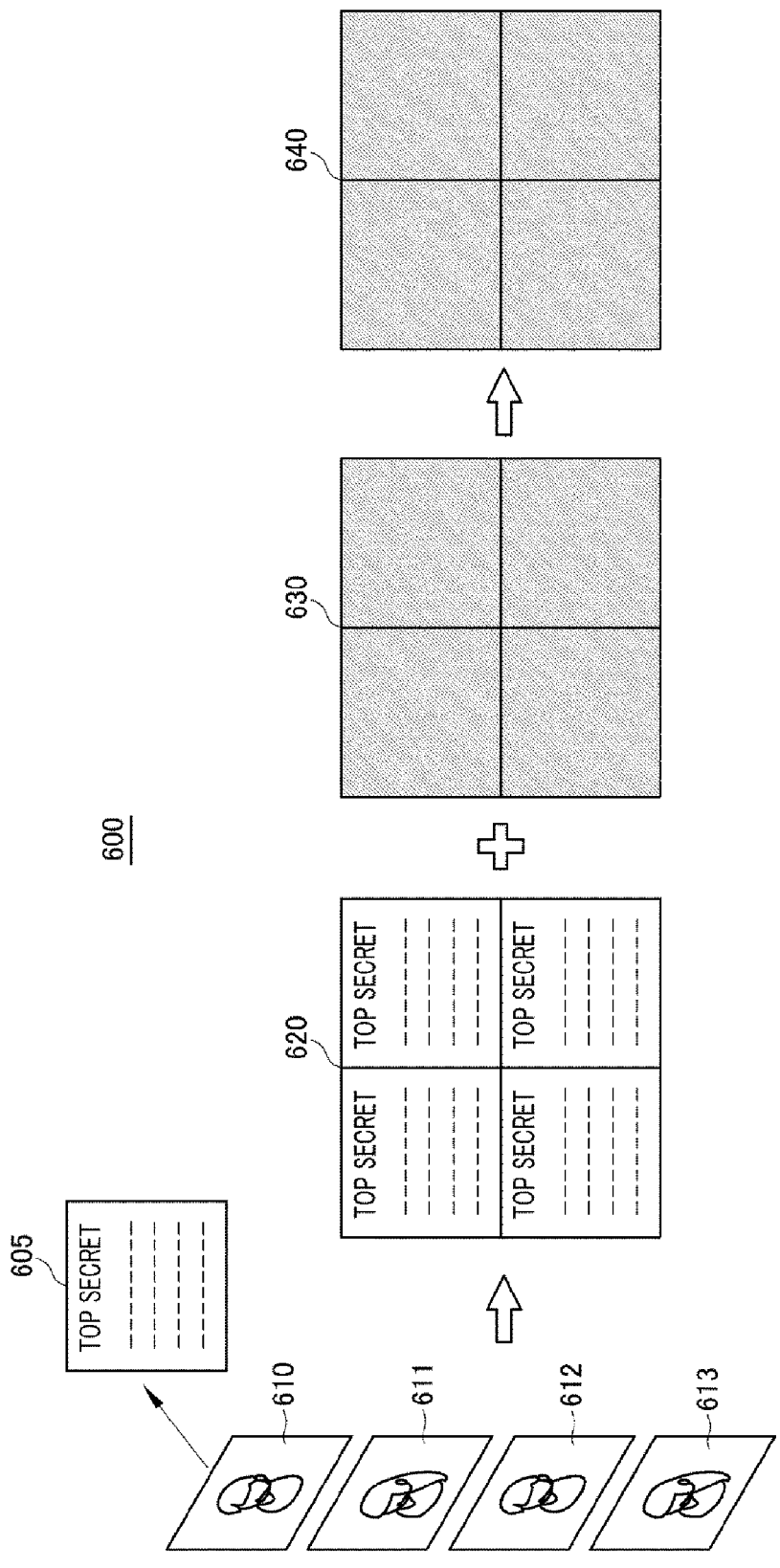
FIG. 6 shows yet another illustrative depiction of video conference generation, in accordance with various embodiments described herein.

FIG. 6 shows an illustrative example process by which at least portions of a generation of conference video data may be implemented, in accordance with various embodiments described herein. In some embodiments, it is assumed that the transmitting devices 610 to 613 respectively correspond to the first, the second, the second, and the third level. The transmitting device 610 may transmit a document file 605 of the first level to server 120, and server 120 may generate further video data 620 including the document file 605.

If device 611 is a receiving device, server 120 may compare the security level of the receiving devices 611 with that of the document file 605. As a result of the comparison, the receiving device 611 may not watch the further video data, because the security level of the receiving device 611 is lower than that of the document file 605. Thus, server 120 may generate security data 630 to replace the further video data. After server 120 streams, to the receiving device 611, the further video data 620 and the security data 630, the receiving device 611 may display a manipulated conference video data 640 by overlapping the conference video data 620 with the security data 630.

Thus, FIG. 6 shows an illustrative example process by which at least portions of a generation of conference video data may be implemented, in accordance with various embodiments described herein.

Figure 7:
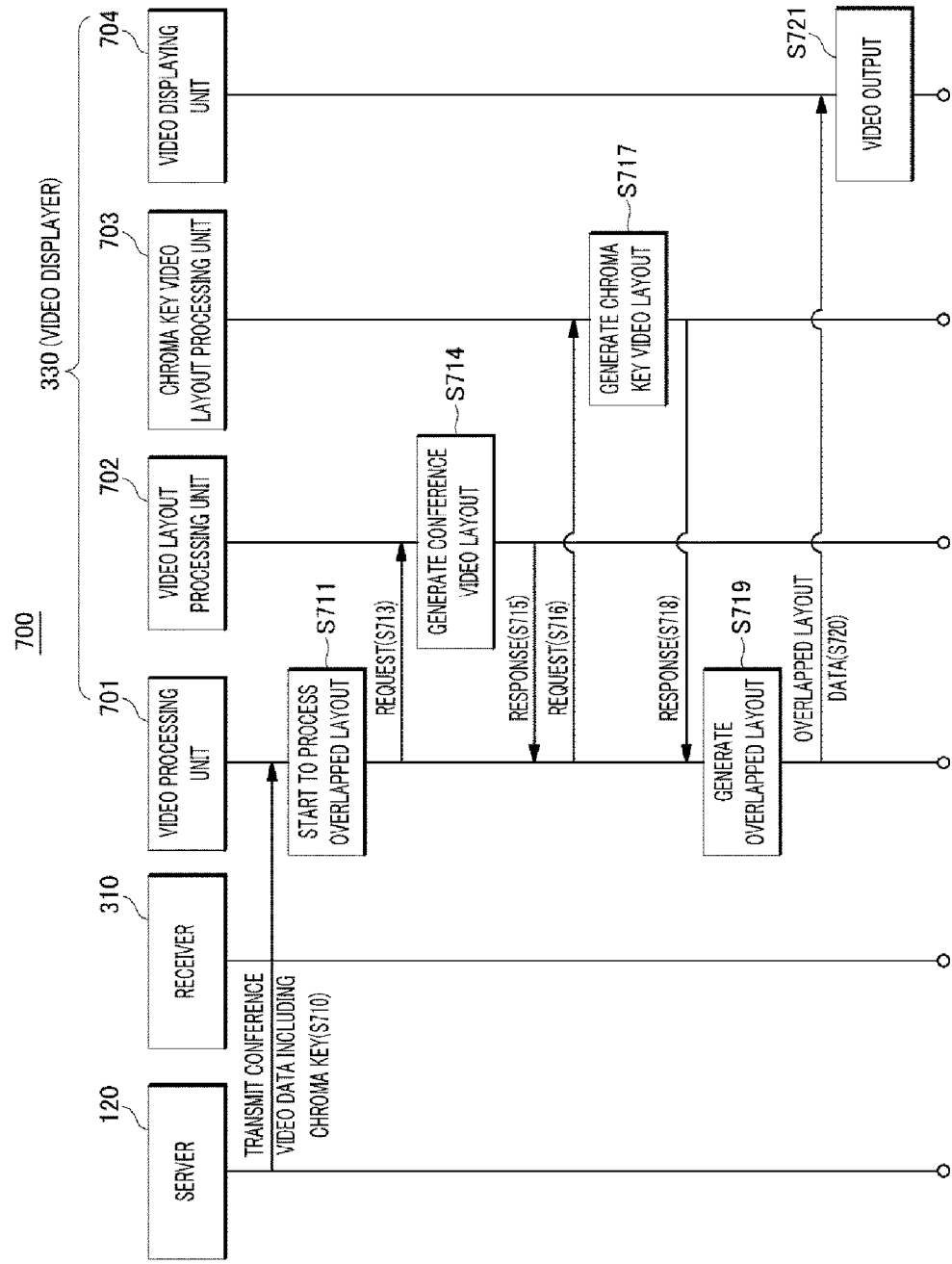
FIG. 7 shows an example processing flow of operations by which at least portions of video conference data generation may be implemented, in accordance with various embodiments described herein.

FIG. 7 shows an example processing flow of operations by which at least portions of a generation of conference video data may be implemented, in accordance with various embodiments described herein. As depicted in FIG. 7, video displayer 330 may include video processing unit 701, video layout processing unit 702, chroma key video layout processing unit 703, and video displaying unit 704.

Video processing unit 701 may receive, from server 120, conference video data and chroma key value (S710). Also, the chroma key value may be transmitted to video processing unit 701 via receiver 310. The chroma key value is an example of security data, and the conference video data may include video data and security data.

Video processing unit 701 may start to process overlapped layout (S711). The overlapped layout may indicate video layout displayed in the screen of device. Video processing unit 701 may request, to video layout processing unit 702, generation of conference video layout (S713). Video layout processing unit 702 may generate conference video layout (S714). Video layout processing unit 702 may transmit, to video processing unit 701, conference video layout (S715). Conference video layout may indicate a layout in which conference video data are displayed.

Video processing unit 701 may request, to chroma key video layout processing unit 703, generation of chroma key video layout. (S716) Chroma key video layout processing unit 703 may generate chroma key video layout. (S717) Chroma key video layout processing unit 703 may transmit, to video processing unit 701, chroma key video layout. (S718) Chroma key video layout may indicate a layout in which other video data are displayed.

Video processing unit 701 may generate overlapped layout data by using chroma key video layout and conference video layout (S719). Video processing unit 701 may transmit, to video displaying unit 704, the overlapped layout data (S720), and video displaying unit 704 may display the video by using the overlapped layout data. (S721).

Thus, FIG. 7 shows an illustrative example process by which at least portions of a generation of conference video data may be implemented, in accordance with various embodiments described herein.

Figure 8:
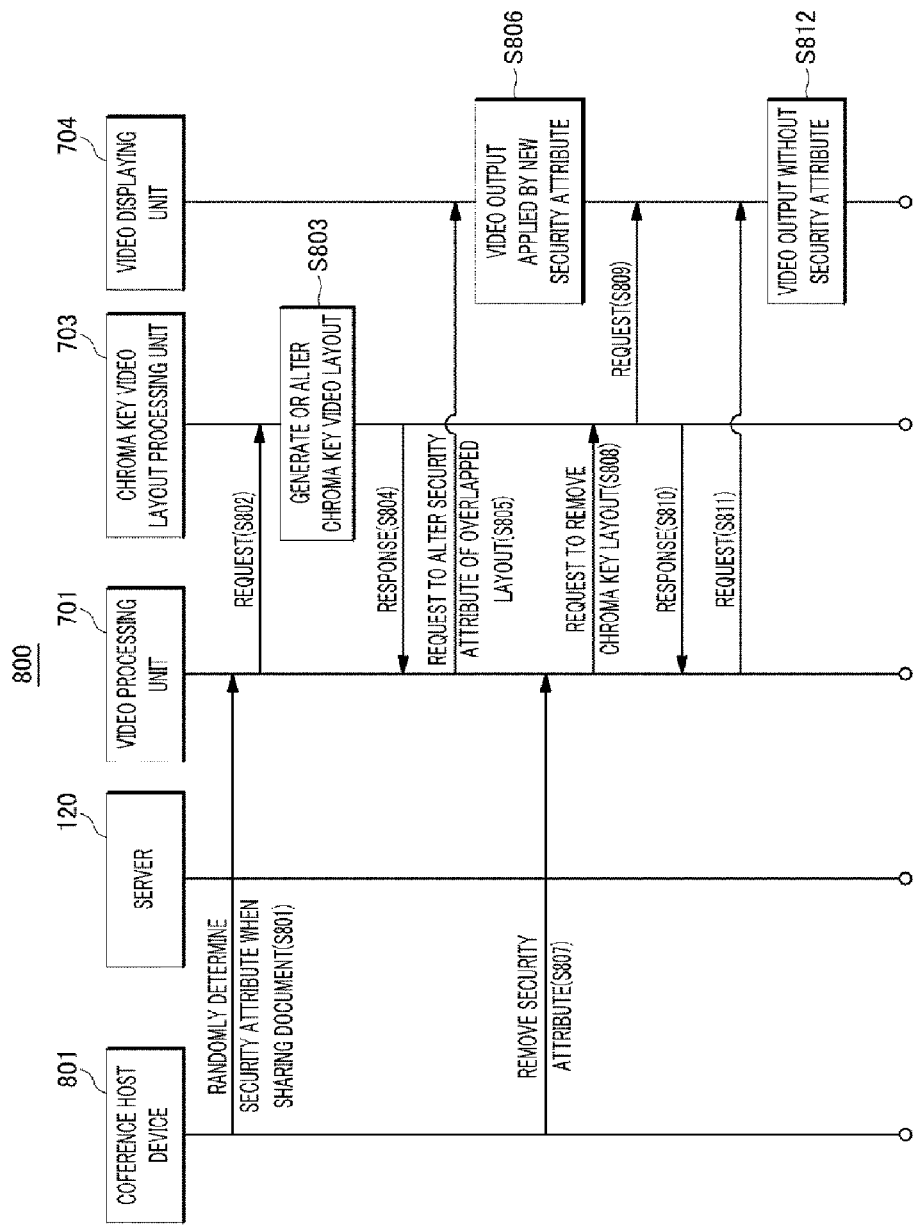
FIG. 8 shows another example processing flow of operations by which at least portions of video conference data generation may be implemented, in accordance with various embodiments described herein.

FIG. 8 shows an example processing flow of operations by which at least portions of a generation of conference video data may be implemented, in accordance with various embodiments described herein. FIG. 8 depicts an example of application and removal of a security attribute.

Server 120 may receive, from conference host device 801, a request to randomly determine a security attribute when sharing a document and transmit, to video processing unit 701, the received request or the information corresponding to the received request (S801). The request may include security data or update data pertaining to shared data or conference video data corresponding to shared data. Further, the security data or update data may include attribute and brightness information of the security attribute (or chroma key layout).

Video processing unit 701 may request an alteration of chroma key layout to chroma key video layout processing unit 703(S802). The request may include attribute and brightness information of the security attribute (or chroma key layout). Chroma key video layout processing unit 703 may generate or alter chroma key video layout (S803), and chroma key video layout processing unit 703 may respond to video processing unit 701 the outcome of the generation or alteration (S804).

Video processing unit 701 may request to video displaying unit 704 an alteration request of security attribute out of overlapped layout by using the outcome of the generation or alteration (S805). Video displaying unit 704 may display a video applied by new security attribute (S806).

Server 120 may receive, from conference host device 801, a request to remove security attribute, and may transmit to video processing unit 701 the received request or information corresponding to the received request (S807).

Video processing unit 701 may request, to chroma key video layout processing unit 703, a removal of chroma key layout (S808), and video processing unit 701 may receive, from chroma key video layout processing unit 703, the outcome of the removal (S810). Further, video processing unit 701 may request, to video displaying unit 704, a removal of security attribute by using the outcome of the removal (S811), and video displaying unit 704 may display a video without security attribute (S812).

If chroma key video layout processing unit 703 requests, to video displaying unit 704, a removal of security attribute (S809), video displaying unit 704 may display a video without security attribute (S812). In such a case, s810 and s811 may not be executed.

Thus, FIG. 8 shows an example processing flow of operations by which at least portions of a generation of conference video data may be implemented, in accordance with various embodiments described herein.

Figure 9:
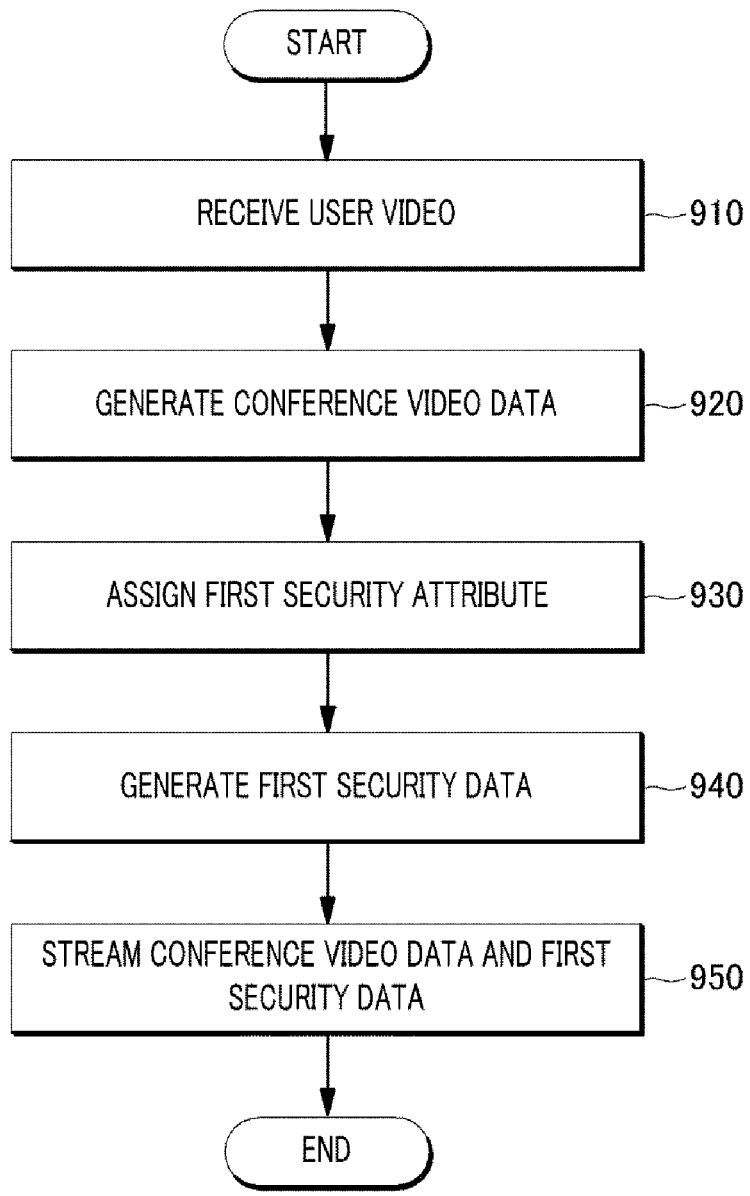
FIG. 9 shows yet another example processing flow of operations by which at least portions of video conference data generation may be implemented, in accordance with various embodiments described herein.

FIG. 9 shows an example processing flow of operations, by which at least portions of a generation of conference video data may be implemented, in accordance with various embodiments described herein. The operations of processing flow 900 may be implemented in system configuration 10 including network 110, server 120, and device 130, 140, 150, and 160, as illustrated in FIG. 1. Processing flow 900 may include one or more operations, actions, or functions as illustrated by one or more blocks 910, 920, 930, 940 and/or 950. Although illustrated as discrete blocks, various blocks may be divided into additional blocks, combined into fewer blocks, or eliminated, depending on the desired implementation. Processing may begin at block 910.

Block 910 (receive user video) may refer to server 120 receiving a user video from a transmitting device. In some embodiments, if four users participate in a video conference through four respective transmitting devices, server 120 may receive the respective four videos recording four users' face, body and background from four transmitting devices, e.g. the first device 130, the second device 140, the third device 150, and the fourth device 160. Processing may proceed from block 910 to block 920.

Block 920 (generate conference video data) may refer to server 120 generating conference video data that includes at least one portion of the user video. Server 120 may generate the conference video data including various arrangements of four videos received from the four transmitting devices, such as diamond, circular, square, or triangle formation. Processing may proceed from block 920 to block 930.

Block 930 (assign first security attribute) may refer to server 120 assigning, in accordance with a security level of a receiving device, a first portion of the conference video data to a first security domain attribute. In some embodiments, it is assumed that four users (two first level users, one second level user, and one third level user) are participating in a video conference. The second level device (or the user's security level corresponding to the second level) may not watch the corresponding section(s) to a user or users of higher level (or the first level), given that the conference video screen is divided into four sections corresponding to each user. That is, the user of the second level device may be capable of watching the section(s) corresponding to a user or users of the second level or lower level. That is, the second level user may watch only two sections including himself and the third level user. In the assignment of security attribute, for the user of the second level, server 120 may assign a first portion corresponding to the first level users a first security attribute so that the second level user may not watch the corresponding first portion. Processing may proceed from block 930 to block 940.

Block 940 (generate first security data) may refer to server 120 generating first security data corresponding to the first security attribute. In some embodiments, for the second level user, server 120 may generate first security data corresponding to the first security attribute so that the first security data may substitute or replace the first portion of the conference video data. The first security data may include the same size image or video file to substitute or replace the first portion, key data to activate such image or video file, audio data distinguished from audio data from the first level users, an instruction to deactivate audio data from the first level users, a chroma key/chroma back value, or the like. Processing may proceed from block 940 to block 950.

Block 950 (stream conference video data and first security data) may refer to server 120 streaming, to the receiving device, the conference video data that includes the at least one portion of the user video and the first security data. In some embodiments, for the second user, streamer 250 may stream, to the second level device, the conference video data including four users and the first security data. That is, the second level user may watch the manipulated conference video data by the first security data including only two users (the second and the third level users). This is because the first security data serves to generate the replacement video data corresponding to the first portion of the conference video data, and the second level device serves to overlap the conference video data with the generated replacement video data.

Thus, FIG. 9 shows an example processing flow of operations, by which at least portions of a generation of conference video data may be implemented, in accordance with various embodiments described herein.

Figure 10:
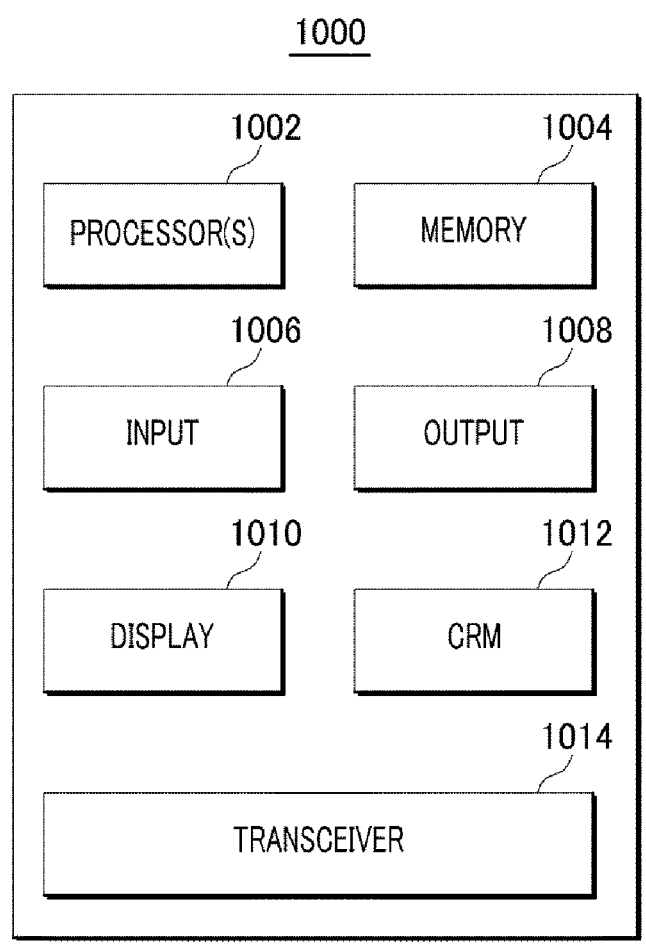
FIG. 10 shows an illustrative computing embodiment, in which any of the processes and sub-processes of a narrative generating scheme may be implemented as computer-readable instructions stored on a computer-readable medium, in accordance with various embodiments described herein.

FIG. 10 shows an illustrative computing embodiment, in which any of the processes and sub-processes of a narrative generating scheme may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 1000 may typically include, at least, one or more processors 1002, a system memory 1004, one or more input components 1006, one or more output components 1008, a display component 1010, a computer-readable medium 1012, and a transceiver 1014.

Processor 1002 may refer to, e.g., a microprocessor, a microcontroller, a digital signal processor, or any combination thereof.

Memory 1004 may refer to, e.g., a volatile memory, non-volatile memory, or any combination thereof. Memory 1004 may store, therein, an operating system, an application, and/or program data. That is, memory 1004 may store executable instructions to implement any of the functions or operations described above and, therefore, memory 1004 may be regarded as a computer-readable medium.

Input component 1006 may refer to a built-in or communicatively coupled keyboard, touch screen, or telecommunication device. Alternatively, input component 1006 may include a microphone that is configured, in cooperation with a voice-recognition program that may be stored in memory 1004, to receive voice commands from a user of computing device 1000. Further, input component 1006, if not built-in to computing device 1000, may be communicatively coupled thereto via short-range communication protocols including, but not limitation, radio frequency or Bluetooth.

Output component 1008 may refer to a component or module, built-in or removable from computing device 1000, that is configured to output commands and data to an external device.

Display component 1010 may refer to, e.g., a solid state display that may have touch input capabilities. That is, display component 1010 may include capabilities that may be shared with or replace those of input component 1006.

Computer-readable medium 1012 may refer to a separable machine readable medium that is configured to store one or more programs that embody any of the functions or operations described above. That is, computer-readable medium 1012, which may be received into or otherwise connected to a drive component of computing device 1000, may store executable instructions to implement any of the functions or operations described above. These instructions may be complimentary or otherwise independent of those stored by memory 1004.

Transceiver 1014 may refer to a network communication link for computing device 1000, configured as a wired network or direct-wired connection. Alternatively, transceiver 1014 may be configured as a wireless connection, e.g., radio frequency (RE), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Thus, FIG. 10 shows an illustrative computing embodiment, in which any of the processes and sub-processes of a narrative generating scheme may be implemented as computer-readable instructions stored on a computer-readable medium, in accordance with various embodiments described herein.

We claim:

1. A method performed under control of a server, comprising:
   receiving a user video from a transmitting device;
   generating conference video data that includes at least one portion of the user video;
   assigning, in accordance with a security level of a receiving device, a first portion of the conference video data a first security attribute;
   generating first security data corresponding to the first security attribute;
   streaming, to the receiving device, the first portion of the conference video data that includes the at least one portion of the user video and the first security data;
   re-setting the security level of the receiving device;
   assigning, in accordance with the reset security level, another portion of the conference video data a reset security attribute;
   generating reset security data corresponding to the reset security attribute; and
   streaming, to the receiving device, at least the reset security data.

2. The method of claim 1, further comprising:
   streaming, if a third device does not require any security data based on a security level of the third device, the conference video data to the third device.

3. The method of claim 1, wherein the first security data includes at least one instruction to deactivate audio data corresponding to the first portion of the conference video data.

4. The method of claim 1, wherein the first security data includes audio data distinguished from audio data included in the user video transmitted from the transmitting device.

5. The method of claim1, wherein the first security data include a chroma key value or a chroma back value.

6. The method of claim 5, wherein the chroma key value includes at least one of attribute information, file size information, RGB information, or brightness information of replacement video data to be displayed in accordance with the first security attribute.

7. The method of claim 1, wherein the first security data includes at least one instruction to generate replacement video data having a same size and shape as the first security attribute and to overlap the conference video data with the replacement video data.

8. The method of claim 1, further comprising:
   receiving, from the transmitting device, an instruction to remove the first security attribute;
   generating updated security data to remove the first security attribute; and
   transmitting the updated security data to the receiving device.

9. The method of claim 1, further comprising:
   receiving, from the transmitting device, an instruction to remove the first security attribute;
   generating updated security data to remove the first security attribute; and
   transmitting the updated security data to the receiving device.

10. A method performed under control of a server, comprising:
    receiving a user video from a transmitting device;
    generating conference video data that includes at least one portion of the user video;
    assigning, in accordance with a security level of a receiving device, a first portion of the conference video data a first security attribute;
    generating first security data corresponding to the first security attribute;
    streaming, to the receiving device, the first portion of the conference video data that includes the at least one portion of the user video and the first security data; and
    receiving another file from another transmitting device;
    generating further video data including the another file;
    comparing a security level of the another file with the security level of the receiving device;
    generating security data for the another file based on the comparison with the security data; and
    streaming, to the receiving device, the further video data that includes the another file and the security data for the another file.

11. The method of claim 10, wherein the first security data includes at least one instruction to deactivate audio data corresponding to the first portion of the conference video data.

12. The method of claim 10, wherein the first security data includes audio data distinguished from audio data included in the user video transmitted from the transmitting device.

13. The method of claim 10, wherein the first security data include a chroma key value or a chroma back value.

14. The method of claim 13, wherein the chroma key value includes at least one of attribute information, file size information, RGB information, or brightness information of replacement video data to be displayed in accordance with the first security attribute.

15. The method of claim 10, wherein the first security data includes at least one instruction to generate replacement video data having a same size and shape as the first security attribute and to overlap the conference video data with the replacement video data.

16. A server comprising:
    a receiver configured to receive a user video from a transmitting device;
    a video data generator configured to generate conference video data that includes at least one portion of the user video;
    a security attribute unit configured to assign, in accordance with a security level of a receiving device, a first portion of the conference video data a first security attribute;
    a security data generator configured to generate first security data corresponding to the first security attribute;
    a streamer configured to stream, to the receiving device, the first portion of the conference video data that includes the at least one portion of the user video and the first security data;
    a security level setter configured to reset the security level of the receiving device, and
    wherein the security attribute unit is further configured to assign, in accordance with the reset security level, a third portion of the conference video data a reset security attribute,
    wherein the security data generator is further configured to generate reset security data corresponding to the reset security attribute, and
    wherein the streamer is further configured to stream, to the receiving device, at least the reset security data.

17. The server of claim 16, the first security data includes a chroma key value or a chroma back value.

18. The server of claim 17, wherein the chroma key value includes at least one of attribute information, file size information, RGB information, or brightness information of replacement video data to be displayed in accordance with the first security attribute.

19. A server comprising:
a receiver configured to receive a user video from a transmitting device;
a video data generator configured to generate conference video data that includes at least one portion of the user video;
a security attribute unit configured to assign, in accordance with a security level of a receiving device, a first portion of the conference video data a first security attribute;
a security data generator configured to generate first security data corresponding to the first security attribute;
a streamer configured to stream, to the receiving device, the first portion of the conference video data that includes the at least one portion of the user video and the first security data;
a comparator configured to compare a security level of another file with the security level of the receiving device, and wherein the receiver is further configured to receive the another file from another transmitting device,
wherein the video data generator is further configured to generate further video data including the another file,
wherein the security data generator is further configured to generate security data for the another file based on the comparison with the security data corresponding to the first security attribute, and
wherein the streamer is further configured to stream, to the receiving device, the further video data that includes the another file and the security data for the another file.

20. The server of claim 19, the first security data includes a chroma key value or a chroma back value.

21. The server of claim 20, wherein the chroma key value includes at least one of attribute information, file size information, RGB information, or brightness information of replacement video data to be displayed in accordance with the first security attribute.

* * * * *